United States Patent
Schaefer et al.

(10) Patent No.: US 11,928,018 B2
(45) Date of Patent: Mar. 12, 2024

(54) COORDINATED ERROR PROTECTION

(71) Applicant: Micron Technology, Inc., Boise, ID (US)

(72) Inventors: Scott E. Schaefer, Boise, ID (US); Aaron P. Boehm, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/889,203

(22) Filed: Aug. 16, 2022

(65) Prior Publication Data

US 2023/0205620 A1 Jun. 29, 2023

Related U.S. Application Data

(60) Provisional application No. 63/294,289, filed on Dec. 28, 2021.

(51) Int. Cl.
*G06F 11/00* (2006.01)
*G06F 11/07* (2006.01)
*G06F 11/10* (2006.01)

(52) U.S. Cl.
CPC ........ *G06F 11/0793* (2013.01); *G06F 11/073* (2013.01); *G06F 11/1048* (2013.01)

(58) Field of Classification Search
CPC .............. G06F 11/0793; G06F 11/073; G06F 11/1004; G06F 11/1012; G06F 11/1048
See application file for complete search history.

(56) References Cited

U.S. PATENT DOCUMENTS

| | | | |
|---|---|---|---|
| 6,567,953 B1 * | 5/2003 | Pomerantz .......... | G06F 11/1004 714/763 |
| 2011/0040924 A1 * | 2/2011 | Selinger .............. | G06F 11/1004 711/E12.008 |
| 2016/0371141 A1 * | 12/2016 | Daniel .................. | H03M 13/29 |

* cited by examiner

*Primary Examiner* — Marc Duncan
(74) *Attorney, Agent, or Firm* — Holland & Hart LLP

(57) ABSTRACT

Methods, systems, and devices for coordinated error protection are described. A set of data and an indication of whether a first management procedure performed by a memory device on the set of data detected one or more errors in the set of data may be received at a host device. At the host device, a second error management procedure may be performed on the set of data received from the memory device. Based on the received indication and the second error management procedure, multiple bits indicating whether one or more errors associated with the set of data were detected at the memory device, the host device, or both may be generated. The set of data may be validated or discarded based on the multiple bits.

30 Claims, 6 Drawing Sheets

COORDINATED ERROR PROTECTION

CROSS REFERENCE

The present application for patent claims priority to U.S. Provisional Patent Application No. 63/294,289 by Schaefer et al., entitled "COORDINATED ERROR PROTECTION", filed Dec. 28, 2021, which is assigned to the assignee hereof, and which is expressly incorporated by reference in its entirety herein.

FIELD OF TECHNOLOGY

The following relates to one or more systems for memory, including coordinated error protection.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
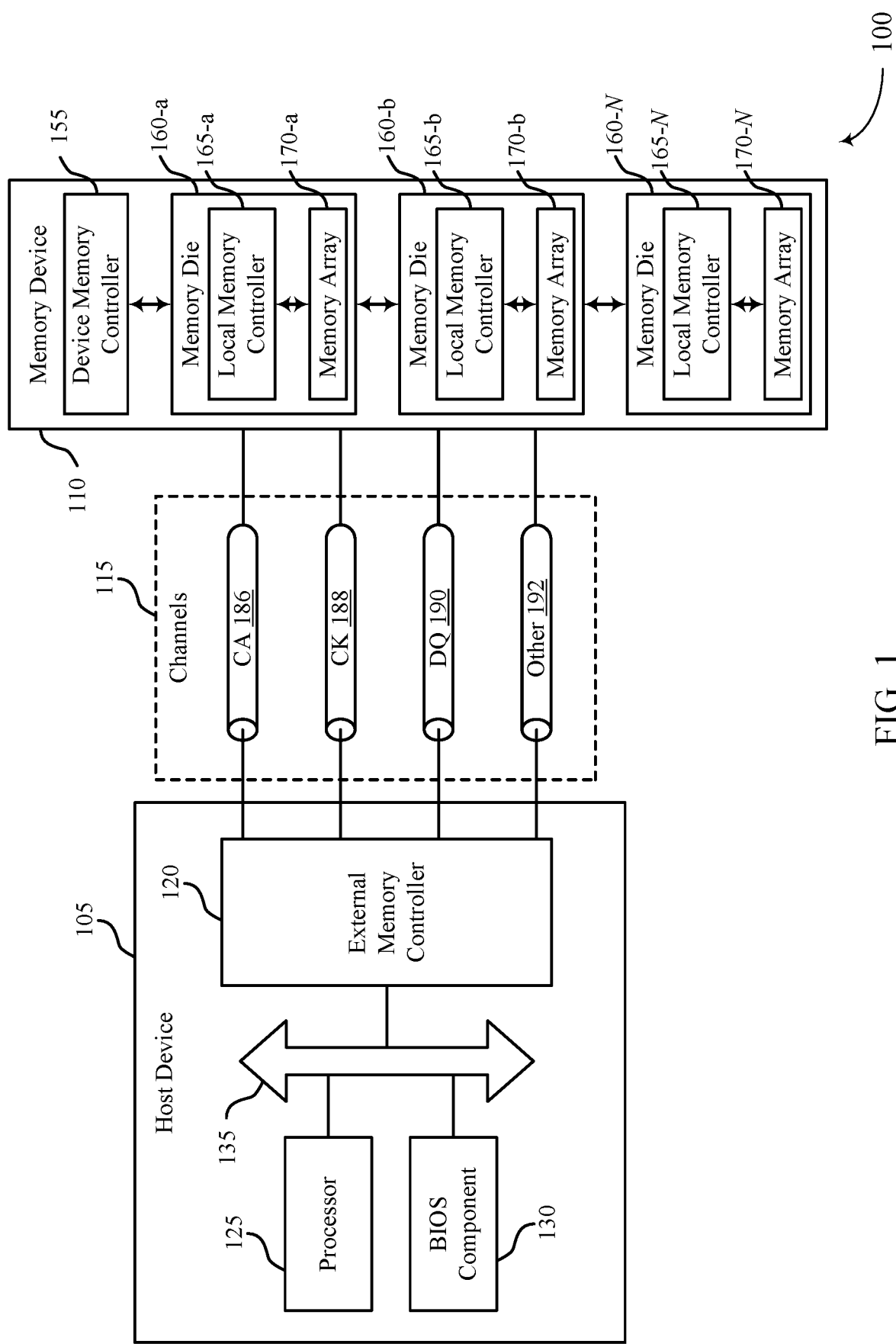
FIG. 1 illustrates an example of a system that supports coordinated error protection in accordance with examples as disclosed herein.

A memory device and a host device may independently perform syndrome matching procedures (which may be referred to as coordinated syndrome matching). A syndrome matching procedure may involve comparing a stored or received set of syndrome bits with a generated set of syndrome bits. The syndrome matching procedure performed at the memory device may generate an indication of whether an error was detected in data retrieved from a memory array at the memory device using an error control operation. The syndrome matching procedure performed at the host device may generate an indication of whether an error was detected in data received from the memory device using an error control operation. The host device may use the results of the syndrome matching procedures at both the memory device and the host device (in combination with a result of an error correction circuit at the host device) to determine whether to validate or discard received data.

The results of the syndrome matching procedures may enable the host device to detect errors that may otherwise be undetectable—e.g., if a transferred set of data includes more than two bit errors. Accordingly, the host device may discard received data that may otherwise have been validated and used by the host device—e.g., to support the functioning of an application. For example, the host device may discard received data when a result of a syndrome match at a memory device indicates an attempt to correct a set of data and a result of a syndrome match at the host device indicates an error in the received set of data—e.g., instead of attempting to correct the error in the received set of data. The additional detection capability provided by the coordinated syndrome matching may increase a reliability of data transfers between the memory device and host device. Though coordinated syndrome matching may enable a host device to detect additional errors (including errors introduced by the memory die 200), a capability of a host device to detect more errors (including errors that are missed by error correction circuitry at the memory die 200, the host device, or both) may be desired—e.g., to further increase a reliability of data transfers.

To further increase a reliability of data transfers between a memory device and host device, techniques for determining additional information from the results of coordinated syndrome matching may be used. The additional information may be used to determine whether to validate or discard data received from a memory device (even if the data is determined as error-free). In some examples, a host device may use the results of the coordinated syndrome matching to determine whether to discard or validate data (e.g., that is otherwise determined as error-free) based on a probability of the data including a missed error. The probability of the data including a missed error may be based on the combined result of the coordinated syndrome matching.

Features of the disclosure are initially described in the context of systems and dies. Features of the disclosure are also described in the context of a syndrome matching system. These and other features of the disclosure are further illustrated by and described with reference to an apparatus diagram and flowcharts that relate to coordinated error protection.

FIG. 1 illustrates an example of a system 100 that supports coordinated error protection in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data.

In some examples, a CA channel 186 may include any quantity of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

A host device 105 may receive a set of data and an indication of whether a first management procedure performed by a memory device 110 on the set of data detected one or more errors in the set of data. The host device 105 may also perform a second error management procedure on the set of data received from the memory device. Based on the received indication and the second error management procedure, the host device 105 may generate multiple bits indicating whether one or more errors associated with the set of data were detected at the memory device, the host device, or both. The host device 105 may validated or discarded the set of data based on the multiple bits.

Figure 2:
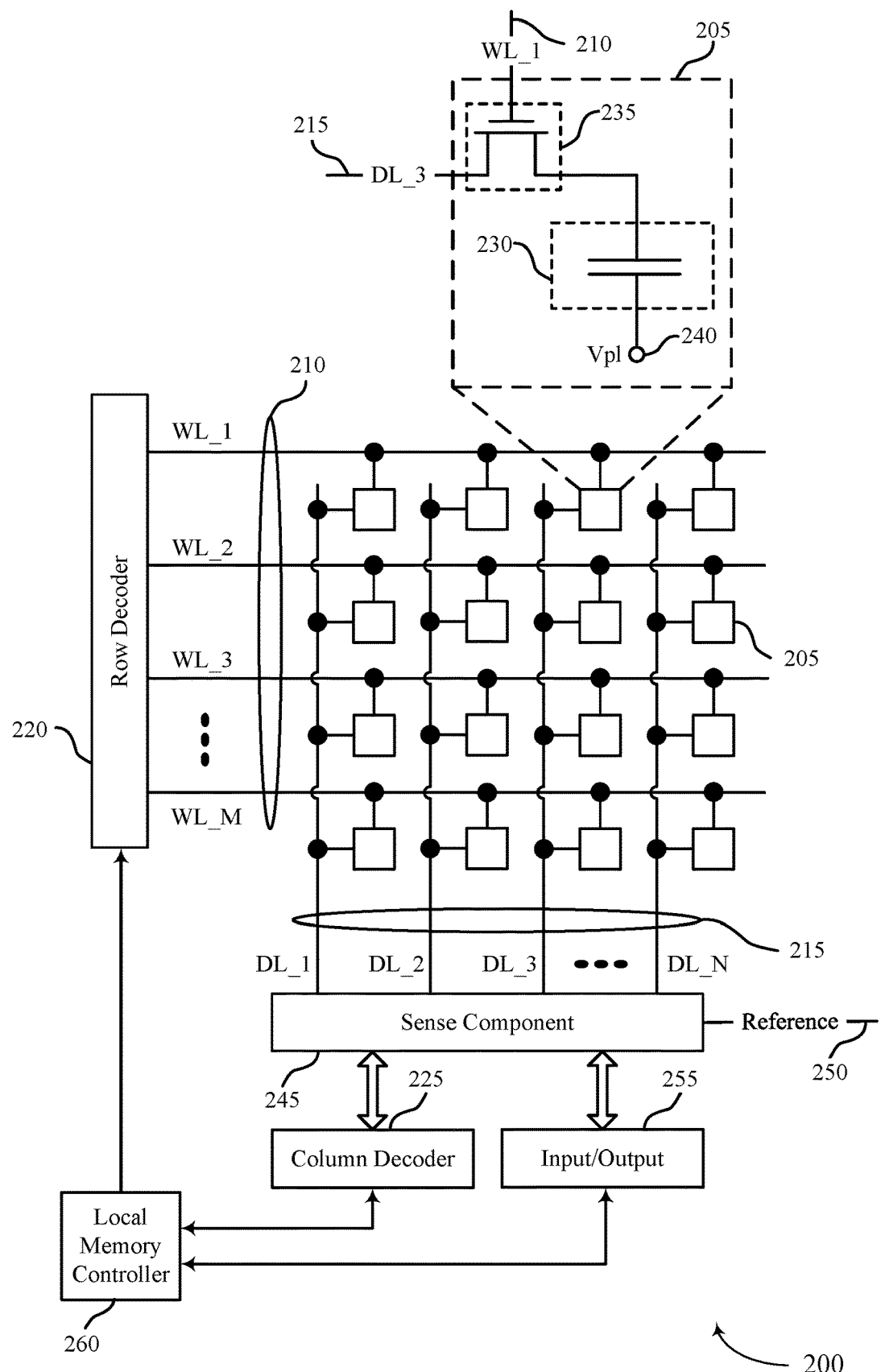
FIG. 2 illustrates an example of a memory die that supports coordinated error protection in accordance with examples as disclosed herein.

FIG. 2 illustrates an example of a memory die 200 that supports coordinated error protection in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

In response to receiving a set of data for storage in a memory array, the memory die 200 (e.g., using an error correction circuit) may be configured to receive or generate a set of parity bits for the set of data. In some examples, the set of parity bits are generated (e.g., at a host device or at memory die 200) based on applying a parity matrix to the set of data bits with the parity bits set to zero. Based on applying the parity matrix, a set of syndrome bits for the set of data bits may be generated, where the generated syndrome bits may provide parity information for the set of data. Thus, syndrome bits and parity bits may be referred to interchangeably herein. The memory die 200 may further be configured to store the set of syndrome bits in the memory array with the set of data—e.g., in a set of memory cells associated with the memory cells used to store the set of data. In response to a read command for the set of data, the memory die 200 may retrieve the set of data and the set of syndrome bits from the memory array. The memory die 200 may transmit both the set of data and the set of syndrome bits to a host device, which may use the set of syndrome bits as parity bits to detect (and, in some examples) correct errors in the set of data.

Also, in response to the read command, the memory die 200 may generate a set of syndrome bits for the set of data, similar to the procedure for generating the stored set of syndrome bits when the set of data was stored in the memory array. The memory die 200 (e.g., using a memory syndrome match circuit, which may also be referred to succinctly as a memory match circuit) may compare the generated set of syndrome bits with the retrieved set of syndrome bits. The result of the comparison may be signaled to the host device. The result of the comparison (which may also be referred to as the result of the syndrome match, an indication of whether the memory die 200 detected an error in the retrieved data, or a "memory syndrome flag") may indicate to the host device whether the memory die 200 attempted to correct the set of data before transmitting the set of data to the host device.

In addition to an error management procedure performed at the host device, the host device may use the result of the syndrome match at memory die 200 to determine whether the received set of data includes an error—e.g., even after an attempt at the memory die 200 to correct the set of data. In some examples, the host device includes a host syndrome match circuit (which may also be succinctly referred to as a host match circuit) that similarly generates a second set of syndrome bits for the received data and compares the second set of generated syndrome bits with the set of syndrome bits received from the memory device. The host device may use the result of the host syndrome match and the result of the memory syndrome match to determine whether to validate or discard data. The host device may use (e.g., process, access, etc.) data that has been validated to support the functioning an application. For example, if the memory syndrome match indicates an attempt to correct the set of data and the host device syndrome match indicates an error in the received set of data, the host device may discard the received set of data without attempting to correct the received set of data. The host device may discard the received data under such circumstances because the combined results of the syndrome matches may indicate that the memory die 200 introduced additional errors into the set of data when attempting to correct the set of data—an attempt to correct a set of data that introduces additional errors may be referred to as aliasing. The additional errors may result in the set of data being uncorrectable at the host device—e.g., even if the host device has a higher-power error management than the memory die 200.

Accordingly, the results of the syndrome matching procedures may enable the host device to detect errors that may otherwise be undetectable (or considered as corrected)—e.g., if a transferred set of data includes more than two bit errors, where one or more of the errors may be introduced by an attempted error correction by memory die 200 or during transmission of the data. Accordingly, the host device may discard received data that may otherwise have been validated and used by the host device—e.g., to support the functioning of an application. For example, the host device may discard received data when a result of a syndrome match at a memory die 200 indicates an attempt to correct a set of data and a result of a syndrome match at the host device indicates an error in the received set of data—e.g., instead of attempting to correct the error in the received set of data. The additional detection capability provided by the coordinated syndrome matching may increase a reliability of data transfers between the memory die 200 and host device. In some examples, coordinated syndrome matching is used for host devices having higher reliability thresholds—e.g., a host device running a mission-critical application or used in an autonomous vehicle. Though coordinated syndrome matching may enable a host device to detect additional errors (including errors introduced by the memory die 200), a capability of a host device to detect more errors (including errors that are missed by error correction circuitry at the memory die 200, the host device, or both) may also be desired—e.g., to further increase a reliability of data transfers.

To further increase a reliability of data transfers between a memory device (e.g., memory die 200) and host device, techniques for determining additional information from the results of coordinated syndrome matching may be used. The additional information may be used to determine whether to validate or discard data received from a memory device. In some examples, a host device may use the results of the coordinated syndrome matching to determine whether to discard or validate data (e.g., that is otherwise determined as error-free) based on a probability of the data including a missed error. The probability of the data including a missed error may be based on the combined result of the coordinated syndrome matching.

In some examples, a host device may receive a set of data and an indication of whether a first error management procedure performed by the memory die 200 on the set of data detected one or more errors in the set of data. The indication may correspond to a result of a syndrome matching operation performed at the memory die 200. The host device may also perform a second error management procedure on the set of data received from the memory die 200. Based on performing the second error management procedure, the host device (e.g., logic at the host device) may generate a multiple-bit code from the indication received from the memory die 200 and the result of the second error management procedure. The multiple bit code may indicate whether one or more errors associated with the set of data were detected at the memory device, the host device, or both. The host device may validate or discard the data received from the memory die 200 based on the multiple-bit code.

By generating a multiple-bit code from the syndrome matching operations, additional information indicating a location of where an error occurred (e.g., at a host device or memory die) may be determined. The determination of the location of the error may further be used to determine a probability that an error in the received set of data went undetected by the error management circuit at the memory device and the host device under different scenarios. A host device may use this probability information to determine whether to validate or discard the received set of data.

Figure 3:
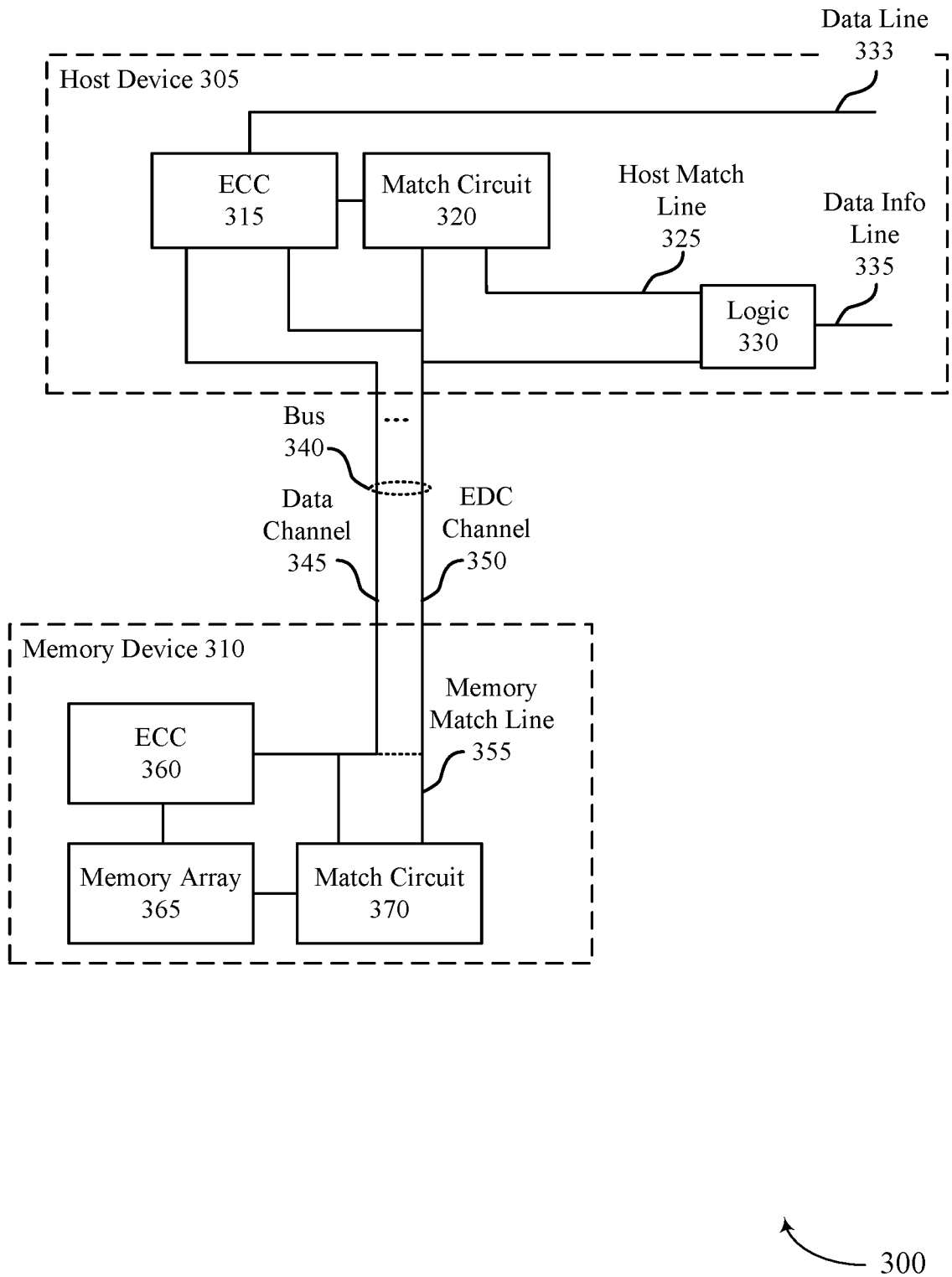
FIG. 3 illustrates an example of a system that supports coordinated error protection in accordance with examples as disclosed herein.

FIG. 3 illustrates an example of a system that supports coordinated error protection in accordance with examples as disclosed herein.

System 300 includes host device 305 and memory device 310, which may be communicatively coupled via bus 340.

Host device 305 may be configured to process data received from an application that is running at or coupled with host device. Host device 305 may be further configured to store the processed data at memory device 310 and to access the data stored in memory device 310 to support the functioning of the application. Host device 305 may include host error correction circuit 315, host match circuit 320, host match line 325, logic 330, data line 333, and data information line 335.

Host error correction circuit 315 may be configured to detect (and, in some examples, correct) errors in data received from memory device 310. For example, host error correction circuit 315 may be capable of detecting and correcting single-bit errors (e.g., if host error correction circuit 315 includes an SEC circuit), correcting single-bit error and detecting double-bit errors (e.g., if host error correction circuit 315 includes a SECDED circuit), and so on.

During a read operation, host error correction circuit 315 may be configured to generate syndrome bits for a received set of data—e.g., based on parity information for the set of data that is also received from memory device 310. The syndrome bits may be used by host error correction circuit 315 to identify one or more bit locations in the received set of data that are erroneous and to invert the one or more bits at the one or more locations. Host error correction circuit 315 may output the (corrected) set of received data to a controller of host device 305—e.g., via data line 333. In some examples, as described in more detail herein, the controller at host device 305 may determine whether to use the (corrected) set of data received from host error correction circuit 315—e.g., based on a probability that the set of data includes one or more errors.

Host error correction circuit 315 may also be configured to generate parity information for a set of data received from memory device 310. In some examples, host error correction circuit 315 generates parity information for the set of data by applying an error correction operation to the set of data with the parity bits set to a zero value. The syndrome bits generated by this error correction operation may be equivalent to (and used as) the parity bits for the set of data. Host error correction circuit 315 may be configured to provide the generated syndrome bits to host match circuit 320.

During a write operation, host error correction circuit 315 may similarly be configured to generate parity information for a set of data to be written to memory device 310 by host device 305. Host device 305 may send, to memory device 310, the syndrome bits generated for the set of data to be written. The generated syndrome bits may be stored at memory device 310 with the set of data—e.g., in adjacent memory cells, in corresponding memory cells, etc.

Host match circuit 320 may be configured to determine whether a set of data received from memory device 310 includes one or more errors. To determine whether the set of received data includes one or more errors, host match circuit 320 may compare syndrome bits generated for the set of received data by host error correction circuit 315 with parity bits (which may also be referred to as received syndrome bits) received from memory device 310 for the set of received data.

If host match circuit 320 detects a mismatch between the generated syndrome bits and the received syndrome bits, host match circuit 320 may determine that there is an error in the received set of data. Host match circuit 320 may be configured to generate a signal (which may be referred to as a "host syndrome flag") that indicates whether an error was detected in the set of data received from memory device 310. In some examples, if an error is detected in the received set of data, the signal may have a high voltage, and vice versa.

Host match line 325 may be configured to convey an output signal generated by host match circuit 320 to logic 330. In some examples, host match line 325 may convey a host syndrome flag that indicates whether host match circuit 320 detected an error in the data received from memory device 310. In some cases, host match line 325 is a conductive trace. In some cases, host match line 325 is a conductive trace.

Logic 330 may be configured to determine whether one or both of host match circuit 320 or memory match circuit 370 detected an error in a processed set of data based on syndrome flag signals received via host match line 325 and memory match line 355. Logic 330 may further be configured to output a signal based on the determination. In some examples, logic 330 may generate a multiple-bit code based on the received syndrome flag signals, where different combinations of the multiple-bit code may be used to indicate whether no errors were detected in a set of data retrieved from memory array 365 or in the set of data when received at host device 305; an error in the set of data retrieved from memory array 365 was detected at memory device 310; an error in the set of data received from memory device was detected at host device 305; or an error in the set of data retrieved from memory array 365 was detected at memory device and an error in the set of received from memory device 310 was detected at host device 305. In some examples, the different error detection combinations (e.g., whether no errors were detected by the memory device or the host device, an error was detected at the memory device, an error was detected at the host device, or an error was detected at both the memory device and the host device) may be associated with different probabilities that data used by host device includes an undetected error. Logic 330 may be configured to output the bits of the multi-bit error code either serially or in parallel.

Data information line 335 may be configured to convey an output signal generated by logic 330. In some cases, data information line 335 includes one or more conductive traces. In other cases, data information line 335 is a wireless link.

Memory device 310 may be configured to store data for host device 305—e.g., application data received at or generated by host device 305. Memory device 310 may include memory error correction circuit 360, memory array 365, memory match circuit 370, and memory match line 355.

Memory error correction circuit 360 may be configured to detect (and, in some examples, correct) errors in data retrieved from memory array 365 (e.g., for host device 305). For example, memory error correction circuit 360 may be capable of detecting and correcting single-bit errors (e.g., if host error correction circuit 315 includes an SEC circuit), correcting single-bit error and detecting double-bit errors (e.g., if host error correction circuit 315 includes a SECDED circuit), and so on.

During a read operation, memory error correction circuit 360 may apply, to data retrieved for host device 305, an error correction code (e.g., parity bits, which may also be referred to as syndrome bits) that was stored for the retrieved data at the time the retrieved data was stored in memory array 365. The syndrome bits generated based on applying the error correction code to the set of data may be used by memory error correction circuit 360 to identify one or more bit locations in the received set of data that are erroneous and to invert the one or more bits at the one or more locations. Memory device 310 may output the (corrected) set of retrieved data to host device 305.

Memory error correction circuit 360 may also be configured to generate parity information for a set of data retrieved from memory array 365. In some examples, memory error correction circuit 360 generates parity information for the retrieved set of data by applying an error correction operation to the retrieved set of data with the parity bits set to a zero value. The syndrome bits generated by this error correction operation may be equivalent to (and used as) the parity bits for the retrieved set of data. Memory error correction circuit 360 may be configured to provide the generated syndrome bits to memory match circuit 370.

During a write operation, memory error correction circuit 360 may similarly be configured to generate parity information for data to be written to memory array 365. To generate an error correction code for a set of data to be written to memory array 365, memory error correction circuit 360 may apply error correction operations to the set of data with the parity information set to a zero value. Memory error correction circuit 360 may be configured to store the generated parity information in memory array 365 with the set of data—e.g., in adjacent memory cells, in corresponding memory cells, etc.

Memory array 365 may be configured to store data received from host device 305 in an array of memory cells. In some examples, data stored in memory array 365 may develop errors when the data is written to memory array 365 (e.g., due to a defective memory cell, interference, etc.) or after the data is written to memory array 365 (e.g., due to neutron strikes, interference, etc.). As described herein, memory error correction circuit 360 may be used to detect errors in data stored in memory array 365 (e.g., so long as the quantity of errors in the stored data does not exceed a detection capability of memory error correction circuit 360) and, in some examples, to mitigate (e.g., correct or discard) errors in the stored data (e.g., based on whether the quantity of errors in the stored data exceeds a correction capability of memory error correction circuit 360).

Memory match circuit 370 may be configured to determine whether a set of data retrieved from memory array 365 includes one or more errors. Memory match circuit 370 may be configured the same as host match circuit 320. Or memory match circuit 370 may be configured similarly, but different than host match circuit 320—e.g., if host error correction circuit 315 is differently configured than memory error correction circuit 360. To determine whether a set of retrieved data includes one or more errors, memory match circuit 370 may compare a set of syndrome bits retrieved from memory array 365 (the set of syndrome bits associated with the set of data retrieved from memory array 365) with a set of syndrome bits generated for the set of data by memory error correction circuit 360.

If memory match circuit 370 detects a mismatch between the generated syndrome bits and the received syndrome bits, memory match circuit 370 may determine that there is an error in the retrieved set of data. Memory match circuit 370 may be configured to generate a signal (which may be referred to as a "memory syndrome flag") that indicates whether an error was detected in the set of data retrieved from memory array 365. In some examples, if an error is detected in the retrieved set of data, the signal may have a high voltage, and vice versa.

Memory match line 355 may be configured to convey an output signal generated by memory match circuit 370 to logic 330 via EDC channel 350. In some examples, memory match line 355 may convey a memory syndrome flag that indicates whether memory match circuit 370 detected (and attempted to correct) an error in data retrieved from memory array 365 and, in some examples, an address associated with the retrieved data. In some cases, memory match line 355 is a conductive trace. In other cases, memory match line 355 is a wireless link.

Bus 340 may include data channel 345 and EDC channel 350. Data channel 345 may be an example of a DQ channel described herein and may be configured to convey data between host device 305 and memory device 310. EDC channel 350 may be an example of a EDC channel described herein and may be configured to convey parity information and syndrome matching information between host device 305 and memory device 310. Bus 340 may be configured to convey data and error correction information for the data from memory device 310 to host device 305—e.g., based on a read command being issued by host device 305. In some examples, bus 340 may deliver data requested by host device 305 after the requested data is processed by memory error correction circuit 360—e.g., after memory error correction circuit 360 detects and attempts to correct identified errors in the requested data. Similarly, bus 340 may be configured to convey data and error correction information for the data from host device 305 to memory device 310—e.g., based on a write command being issued by host device 305.

In some examples, errors are introduced into the set of data transmitted from memory device 310 to host device 305 while the data is being transmitted over bus 340—e.g., by interference. Memory match circuit 370 may enable host device 305 to determine whether the set of data included an error when it was retrieved from memory array 365. Thus, host device 305 may be capable of determining with an increased level of certainty whether an error was introduced into the received set of data during transmission over bus 340 (which may be correctable) rather than by memory error correction circuit 360 (which may cause the received set of data being uncorrectable).

In some cases, host device 305 uses host match circuit 320, memory match circuit 370, and logic 330 to detect otherwise undetectable errors (e.g., multi-bit errors in data retrieved from memory array 365) in received data, as shown in Table 1.

TABLE 1

| Pre-Mem ECC | Mem Syndrome Flag | Host Syndrome Flag | Logic Flag | Host Error Detection |
|---|---|---|---|---|
| No Error | Low | Low | 1000 | Detects No Error in Received Data |
| SBE | High | Low | 0100 | Detects SBE Correction |
| MBE | Low | High | 0010 | Detects Memory MBE or Host SBE/MBE |
| DBE w/out Aliasing | High | High | 0001 | Detects DBE in Received Data |
| DBE w/ Aliasing | High | High | 0001 | Detects MBE in Received Data—e.g., won't treat detected error as SBE |
| MBE | High | High | 0001 | Detects MBE in Received Data—e.g., won't treat odds as SBE |

Also, host device 305 may use host match circuit 320, memory match circuit 370, and logic 330 to determine a probability of whether a set of data received from memory device, processed by host error correction circuit 315, and validated by host device 305 includes an undetected error as shown in Table 2. Based on the associated probability, host device 305 may determine whether to discard or validate data output by host error correction circuit 315.

TABLE 2

| Syndrome Flag | | Mem ECC | | I/O | | Host ECC | | Error | | Host ECC Mode |
|---|---|---|---|---|---|---|---|---|---|---|
| Mem | Host | Det | Und | Det | Und | Det | Und | Det | Und | |
| Low | Low | 99.6 | .4 | 0 | .3 | 99.8 | .2 | 99.999 | .001 | Correction \| Detection |
| High | Low | 100 | 0 | 0 | .3 | 99.8 | .2 | 99.8 | .2 | Correction \| Detection |
| Low | High | 99.6 | .4 | 0 | .3 | 68.8 | 31.2 | 99.782 | .218 | Correction |
| Low | High | 99.6 | .4 | 0 | .3 | 99.8 | .2 | 99.999 | .001 | Detection |
| High | High | 100 | 0 | 0 | .3 | 100 | 0 | 100 | 0 | Correction \| Detection |

Table 2 may represent a probability of whether a set of data retrieved from memory array 365 has made it through host error correction circuit 315 with an error (that is, the probability that an error in a set of data used by host device 305 has gone undetected) based on where errors (if any) were detected within system 300. For example, if no errors are detected in a retrieved set of data through system 300, a probability that the set of data includes an undetected error is 0.001 percent. Particularly, if memory error correction circuit 360 determines that the retrieved set of data is error-free, then there may be a 0.4 percent probability that there is an error in the retrieved set of data that was missed by memory error correction circuit 360. During transmission of the retrieved set of data, there may be a 0.3 percent chance that an error is introduced into the transmitted version retrieved set of data—since there is no dedicated ECC for bus 340, any errors introduced into the transmitted version of the retrieved set of data may go undetected. If host error correction circuit 315 determines that the received version of the retrieved set of data is error-free, there may be a 0.2 percent chance that there is an error in the received version of the retrieved set of data that is missed by host error correction circuit 315. Accordingly, between memory error correction circuit 360, bus 340, and host error correction circuit 315, the probability that an undetected error is included in a set of data used by host device 305 may be lower (e.g., the probability that an undetected error is included in a set of data may be equivalent to 0.001 percent). Thus, an error detection capability of system 300 may be equivalent to 99.999 percent when no error is detected by memory error correction circuit 360 or host error correction circuit 315.

Similarly, if an error is detected in the data retrieved from memory array 365 but not in the data received at host device 305, the probability that an undetected error is included in a set of data used by (e.g., validated by) host device 305 may be equivalent to 0.2 percent. And an error detection capability of system 300 may be equivalent to 99.8 percent when no error is detected by memory error correction circuit 360 or host error correction circuit 315.

Table 2 may represent error detection probabilities that are determined if memory error correction circuit 360 includes a SEC circuit and host error correction circuit 315 includes a SECDED circuit. If memory error correction circuit 360 instead includes a SECDED circuit, then the probability of detecting an error may become 99.8 percent and missing an error may become 0.2%. Similarly if host error correction circuit 315 instead includes a SEC circuit, then the probability of detecting an error may become 99.6 percent and missing an error may become 0.4%. The combined error detection capabilities may similarly change based on the different combinations of error detection circuit that may be implemented within system 300.

In some examples, the different codes output by logic 330 may correspond to the different probabilities that the data output by host error correction circuit 315 actually includes a missed error. For example, a code of 1000 (which indicates no errors were detected by either memory error correction circuit 360 or host error correction circuit 315) may correspond to a system-level error detection capability of 99.999%. A code of 0100 may correspond to a system-level error detection capability of 99.8%. A code of 0010 may correspond to a system-level error detection capability of 99.782% (if a correction mode is enabled at host device 305) or a system-level error detection capability of 99.999% (if a detection mode is enabled at host device 305). If a correction mode is enabled at host device 305, host error correction circuit 315 may attempt to correct a detected error in a received set of data. If a correction mode is enabled at host device 305, host error correction circuit 315 may discard a received set of data if an error is detected in the received set of data. A code of 0001 may correspond to a system-level error detection capability of 100%—since all received data may be discarded, no errors will be missed.

Host device 305 may determine whether to discard or validate data output from host error correction circuit 315 as error-free based on the associated probabilities of the output data including a missed error. For example, host device 305 may be configured to discard data when logic 330 outputs a code of 0010 (when a detection mode is enabled)—e.g., based on the associated detection capability of 99.782% being below a detection capability threshold (e.g., 99.8%). Also, host device 305 may be configured to validate data when logic 330 outputs a code of 0010 (when a detection mode is enabled). —e.g., based on the associated detection capability of 99.999% being above the detection capability threshold (e.g., 99.8%)

In some examples, host device 305 is configured to discard or validate data based on whether a high-reliability mode is configured at host device 305. The high-reliability mode may be associated with an increased detection capability threshold (e.g., 99.9%). Accordingly, when operating in the high-reliability mode, host device 305 may be configured to discard data when logic 330 outputs a code of 0100 or 0010 (when a detection mode is enabled). In some examples, a controller at host device 305 enters the high-reliability mode at a request of an application supported by host device 305. After entering the high-reliability mode, the controller may be configured to discard data associated with a subset of the codes (e.g., that includes code 0010 when a correction mode is enabled, code 0100, and code 0001). While in the standard-reliability mode, the controller may be configured to discard data associated with a different subset of the codes (e.g., that includes code 0001). Additional reliability modes may be configured that are associated with different subsets of the codes, including an intermediate-reliability mode that may be configured to discard data when code 0100 is obtained and the correction mode is enabled. In some examples, the controller simultaneously operates in different modes for different applications—e.g., a standard-reliability mode for a first application and a high-reliability mode for another application.

In some examples, a controller at host device 305 obtains the detection capability threshold from the register, an application, or a combination thereof and a detection capability of host device 305 from a register at host device 305. The controller may also receive, from memory device 310, an indication of the detection capability of memory device 310. In some examples, the controller may compute a system-level detection capability for different scenarios based on the obtained detection capability of host device 305 and the detection capability information of memory device 310. In some examples, one or more tables may be stored at host device 305 for different combinations of error correction circuitry configured at host device 305 and memory device 310, where the tables may store the associated detection capabilities for the different error detection scenarios. The controller may use the determined system-level detection capability and the obtained detection capability threshold to determine which codes indicate data to validate and which codes indicate data to be discarded. In some examples, one or more tables at host device 305 may indicate which codes to validate data for and which codes to discard data for based on a combination of error correction circuitry configured at host device 305 and memory device 310, a mode configured at host device 305, a type of application being supported by host device 305, or any combination thereof.

Figure 4:
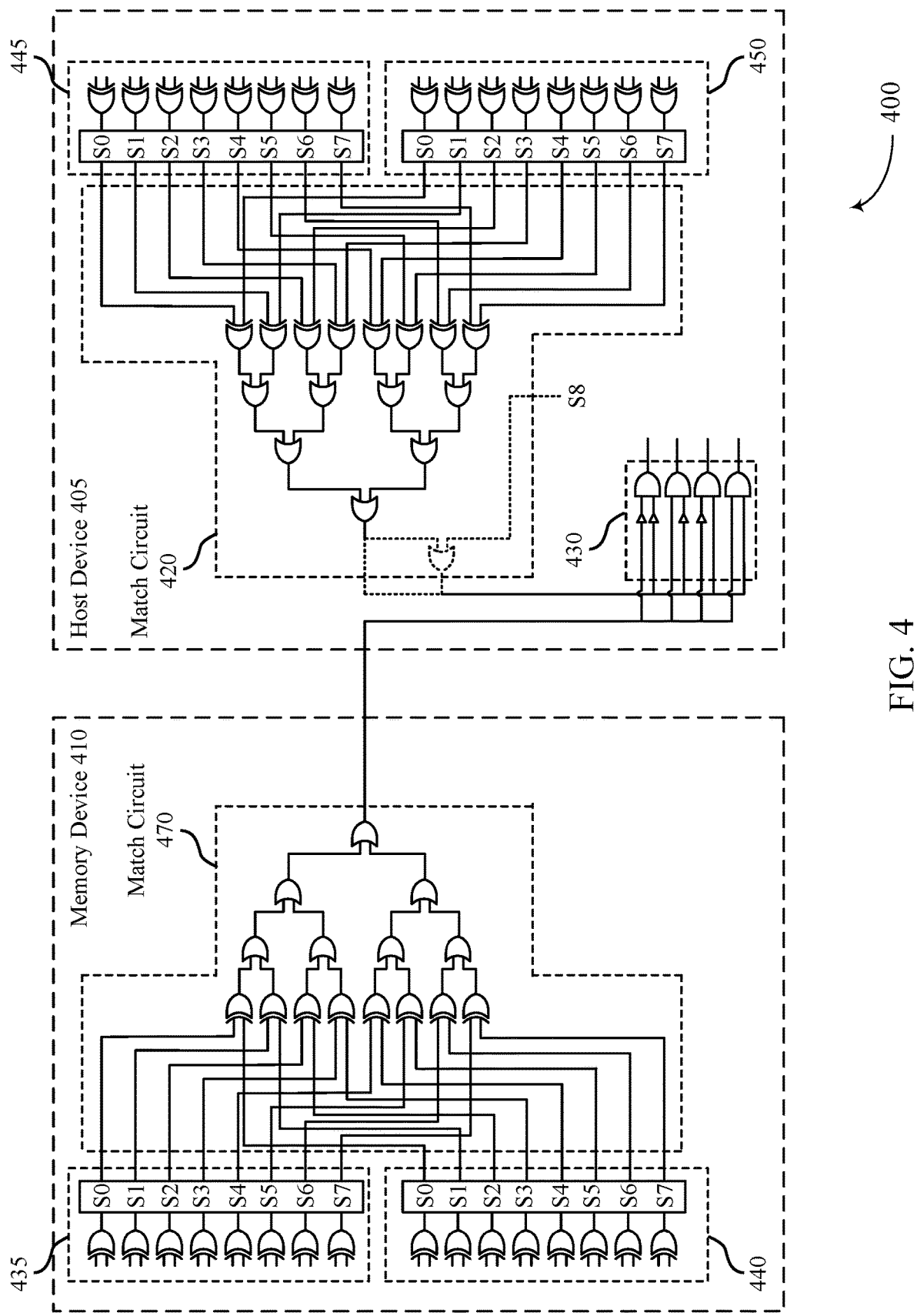
FIG. 4 illustrates an example of a syndrome matching system that supports coordinated error protection in accordance with examples as disclosed herein.

FIG. 4 illustrates an example of a syndrome matching system that supports coordinated error protection in accordance with examples as disclosed herein.

Syndrome matching system 400 may be configured to determine where one or more errors have been detected within a system including host device 405 and memory device 410. Syndrome matching system 400 may also be configured to generate a code based on an output of memory match circuit 470 and an output of host match circuit 420, where the code may be used to determine whether to validate or discard data obtained at host device 405. Host device 405 may be an example of a host device described herein. Memory device 410 may be an example of a memory device or memory die described herein.

Memory device 410 may include memory match circuit 470, which may be an example of memory match circuit 370 of FIG. 3. Memory match circuit 470 may include a set of exclusive OR gates and a set of OR gates that are configured to determine whether a set of syndrome bits stored for retrieved data (e.g., stored syndrome bits 435) are different than a set of syndrome bits generated (e.g., by memory error correction circuit 360 of FIG. 3) for the retrieved data (e.g., memory generated syndrome bits 440). In some examples, stored syndrome bits 435 are retrieved directly from a memory array and the exclusive OR gates shown for stored syndrome bits 435 are omitted.

Memory match circuit 470 may be configured to output a high voltage (which may correspond to a logic 1) when stored syndrome bits are different than memory generated syndrome bits 440. The high voltage may indicate that an error was detected in a corresponding set of data retrieved from a memory array. A low voltage may indicate that no error was detecting in the set of data retrieved from the memory array.

Similarly, host device 405 may include host match circuit 420, which may be an example of host match circuit 320 of FIG. 3. Host match circuit 420 may include a set of exclusive OR gates and a set of OR gates that are configured to determine whether a set of syndrome bits received from a memory device for retrieved data (e.g., received syndrome bits 445) are different than a set of syndrome bits generated (e.g., by host error correction circuit 315 of FIG. 3) for the retrieved data (e.g., host generated syndrome bits 450). In some examples, received syndrome bits 445 are retrieved directly from bus and the exclusive OR gates shown for stored syndrome bits 435 are omitted.

In some examples, host match circuit 420 is configured similar to memory match circuit 470 (e.g., if both match circuits include SEC circuits). In some examples, host match circuit 420 is configured similar, but different than, memory match circuit 470 (e.g., if memory match circuit 470 includes an SEC circuit and host match circuit 420 includes a SECDED circuit). In such cases, host match circuit 420 may process an additional syndrome bit (which may be referred to as the DED bit). The DED bit may indicate whether the received set of data includes an even quantity of bit errors or odd quantity of bit errors. Particularly, an additional OR gate within host match circuit 420 may be used to apply an OR operation to an output of the comparison of the parity bits with the DED bit.

When the DED bit is omitted, host match circuit 420 may be configured to output a high voltage (which may correspond to a logic 1) when received syndrome bits 445 are different than host generated syndrome bits 450. The high voltage may indicate that an error was detected in a corresponding set of data received from memory device 410. A low voltage may indicate that no error was detecting in the set of data received from memory device 410. When the DED bit is included, host match circuit 420 may be configured to output a high voltage when either the DED bit is a logic 1 or when the syndrome match circuit outputs a logic 1.

Host device 405 may also include logic 430, which may be an example of logic 330 of FIG. 3. Logic 430 may output a multi-bit code based on a memory syndrome flag output by memory match circuit 470 and a host syndrome flag output by host match circuit 420). For example, logic 430 may output a code 1000 if both memory match circuit 470 and host match circuit 420 determine that the respective sets of compared syndrome bits match—e.g., if a logic 00 is input to logic 430. A code 0100 if memory match circuit 470 determines that a compared set of syndrome bits do not match and host match circuit 420 determines that a second compared set of syndrome bits match—e.g., if a logic 10 is input to logic 430. A code 0010 if memory match circuit 470 determines that a compared set of syndrome bits match and host match circuit 420 determines that a second compared set of syndrome bits do not match—e.g., if a logic 01 is input to logic 430. And a code 0001 if memory match circuit 470 determines that a compared set of syndrome bits do not match and host match circuit 420 determines that a second compared set of syndrome bits do not match—e.g., if a logic 11 is input to logic 430.

Logic 430 may include a first AND gate having both inputs coupled with inverters, a second AND gate having one input coupled with an inverter, a third AND gate having the other input than the second AND gate coupled with an inverter, and a fourth AND gate. The inverters coupled with the first AND gate may be coupled with respective outputs of memory match circuit 470 and host match circuit 420. The inverter coupled with the second AND gate may be coupled with an output of host match circuit 420. The inverter coupled with third AND gate may be coupled with an output of memory match circuit 470. And the inputs of the fourth AND gate may be coupled with respective outputs of memory match circuit 470 and host match circuit 420. Based on the configuration of AND gates and inverters, logic 430 may output the above logical codes when the above logical inputs are received. In some examples, logic 430 is a demultiplexer where the outputs of memory match circuit 470 and host match circuit 420 may be the inputs to the demultiplexer.

Figure 5:
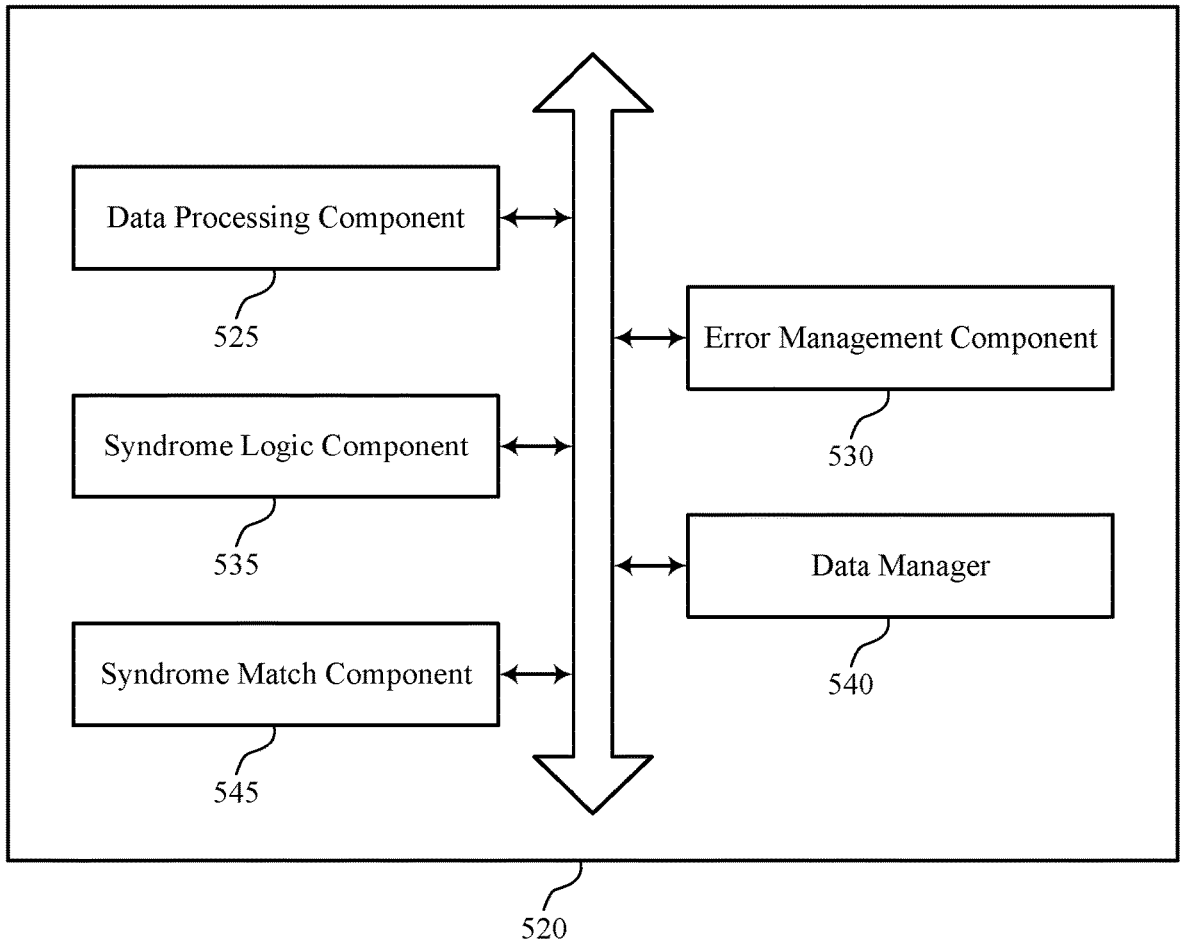
FIG. 5 shows a block diagram of a host device that supports coordinated error protection in accordance with examples as disclosed herein.

FIG. 5 shows a block diagram 500 of a host device 520 that supports coordinated error protection in accordance with examples as disclosed herein. The host device 520 may be an example of aspects of a host device as described with reference to FIGS. 1 through 4. The host device 520, or various components thereof, may be an example of means for performing various aspects of coordinated error protection as described herein. For example, the host device 520 may include a data processing component 525, an error management component 530, a syndrome logic component 535, a data manager 540, a syndrome match component 545, or any combination thereof. Each of these components may communicate, directly or indirectly, with one another (e.g., via one or more buses).

The data processing component 525 may be configured as or otherwise support a means for receiving, from a memory device, a set of data and an indication of whether a first error management procedure performed by the memory device on the set of data detected one or more errors in the set of data. The error management component 530 may be configured as or otherwise support a means for performing, at a host device, a second error management procedure on the set of data received from the memory device. The syndrome logic component 535 may be configured as or otherwise support a means for generating, based at least in part on the indication and the second error management procedure, a plurality of bits indicating whether one or more errors associated with the set of data were detected at the memory device, the host device, or both. The data manager 540 may be configured as or otherwise support a means for validating or discarding the set of data based at least in part on the plurality of bits.

In some examples, the syndrome logic component 535 may be configured as or otherwise support a means for determining that the first error management procedure identified the set of data as error-free based at least in part on the indication. In some examples, the syndrome logic component 535 may be configured as or otherwise support a means for determining that the second error management procedure identified the set of data as error-free based at least in part on a result of the second error management procedure, where generating the plurality of bits is based at least in part on determining that the first error management procedure and the second error management procedure identified the set of data as error-free. In some examples, the data manager 540 may be configured as or otherwise support a means for validating, based at least in part on generating the plurality of bits, the set of data for use based at least in part on the plurality of bits indicating that the set of data is error-free.

In some examples, the syndrome logic component 535 may be configured as or otherwise support a means for determining that the first error management procedure detected an error in the set of data based at least in part on the indication. In some examples, the syndrome logic component 535 may be configured as or otherwise support a means for determining that the second error management procedure identified the set of data as error-free based at least in part on a result of the second error management procedure, where generating the plurality of bits is based at least in part on determining that the first error management procedure detected the error in the set of data and the second error management procedure identified the set of data as error-free.

In some examples, the data manager 540 may be configured as or otherwise support a means for validating, when a first operating mode associated with a first threshold for data reliability is activated, the set of data for used based at least in part on the plurality of bits indicating that the first error management procedure detected the error in the set of data and the second error management procedure identified the set of data as error-free. In some examples, the data manager 540 may be configured as or otherwise support a means for discarding, when a second operating mode associated with a second threshold for data reliability is activated, the set of data based at least in part on the plurality of bits indicating that the first error management procedure detected the error in the set of data and the second error management procedure identified the set of data as error-free, where the first threshold is less than the second threshold.

In some examples, the syndrome logic component 535 may be configured as or otherwise support a means for determining that the first error management procedure identified the set of data as error-free based at least in part on the indication. In some examples, the syndrome logic component 535 may be configured as or otherwise support a means for determining that the second error management procedure detected an error in the set of data based at least in part on a result of the second error management procedure, where generating the plurality of bits is based at least in part on determining that the first error management procedure identified the set of data as error-free and the second error management procedure detected the error in the set of data. In some examples, the data manager 540 may be configured as or otherwise support a means for discarding, when a mode associated with detecting errors is activated, the set of data based at least in part on the plurality of bits indicating that the second error management procedure detected the error in the set of data.

In some examples, the syndrome logic component 535 may be configured as or otherwise support a means for determining that the first error management procedure identified the set of data as error-free based at least in part on the indication. In some examples, the syndrome logic component 535 may be configured as or otherwise support a means for determining that the second error management procedure detected an error in the set of data based at least in part on a result of the second error management procedure, where generating the plurality of bits is based at least in part on determining that the first error management procedure identified the set of data as error-free and the second error management procedure detected the error in the set of data. In some examples, the error management component 530 may be configured as or otherwise support a means for attempting, by the second error management procedure when a mode associated with correcting errors is activated, to correct the error in the set of data based at least in part on the plurality of bits indicating that the first error management procedure identified the set of data as error-free and the second error management procedure detected the error in the set of data.

In some examples, the data manager 540 may be configured as or otherwise support a means for validating, when a first operating mode associated with a first threshold for data reliability being activated, the set of data based at least in part on the second error management procedure attempting to correct the error in the set of data. In some examples, the data manager 540 may be configured as or otherwise support a means for discarding, when a second operating mode associated with a second threshold for data reliability being activated, the set of data based at least in part on the plurality of bits indicating that the first error management procedure identified the set of data as error-free and the second error management procedure detected the error in the set of data.

In some examples, the syndrome logic component 535 may be configured as or otherwise support a means for determining that the first error management procedure detected a first error in the set of data based at least in part on receiving the indication. In some examples, the syndrome logic component 535 may be configured as or otherwise support a means for determining that the second error management procedure detected a second error in the set of data based at least in part on a result of the second error management procedure, where generating the plurality of bits is based at least in part on determining that the first error management procedure and the second error management procedure detected errors in the set of data. In some examples, the data manager 540 may be configured as or otherwise support a means for discarding the set of data based at least in part on the plurality of bits indicating the first error management procedure and the second error management procedure detected errors in the set of data.

In some examples, to support performing the second error management procedure, the syndrome match component 545 may be configured as or otherwise support a means for generating a first set of bits associated with error management based at least in part on the set of data received from the memory device. In some examples, to support performing the second error management procedure, the syndrome match component 545 may be configured as or otherwise support a means for comparing the first set of bits associated with error management and a second set of bits associated with error management that is received from the memory device. In some examples, to support performing the second error management procedure, the syndrome match component 545 may be configured as or otherwise support a means for outputting a result of the comparing, where a result of the second error management procedure is based at least in part on the result of the comparing.

In some examples, to support outputting the result of the comparing, the syndrome match component 545 may be configured as or otherwise support a means for outputting a first logic value if the first set of bits associated with error management is different than the second set of bits associated with error management or a second logic value if the first set of bits associated with error management is the same as the second set of bits associated with error management, where the first logic value is associated with detecting an error in the set of data and the second logic value is associated with identifying the set of data as error-free.

In some examples, to support performing the second error management procedure, the syndrome match component 545 may be configured as or otherwise support a means for generating a bit based at least in part on the set of data and the second set of bits associated with error management received from the memory device. In some examples, to support performing the second error management procedure, the syndrome match component 545 may be configured as or otherwise support a means for comparing the bit with the result of the comparing. In some examples, to support performing the second error management procedure, the syndrome match component 545 may be configured as or otherwise support a means for outputting a result of the second comparing, where the result of the second error management procedure is based at least in part on the result of the second comparing.

In some examples, to support outputting the result of the comparing, the syndrome match component 545 may be configured as or otherwise support a means for outputting a first logic value if the bit and the result of the comparing represents the first logic value or a second logic value if the bit or the result of the comparing represent the second logic value, where the first logic value is associated with detecting an error in the set of data and the second logic value is associated with identifying the set of data as error-free.

Figure 6:
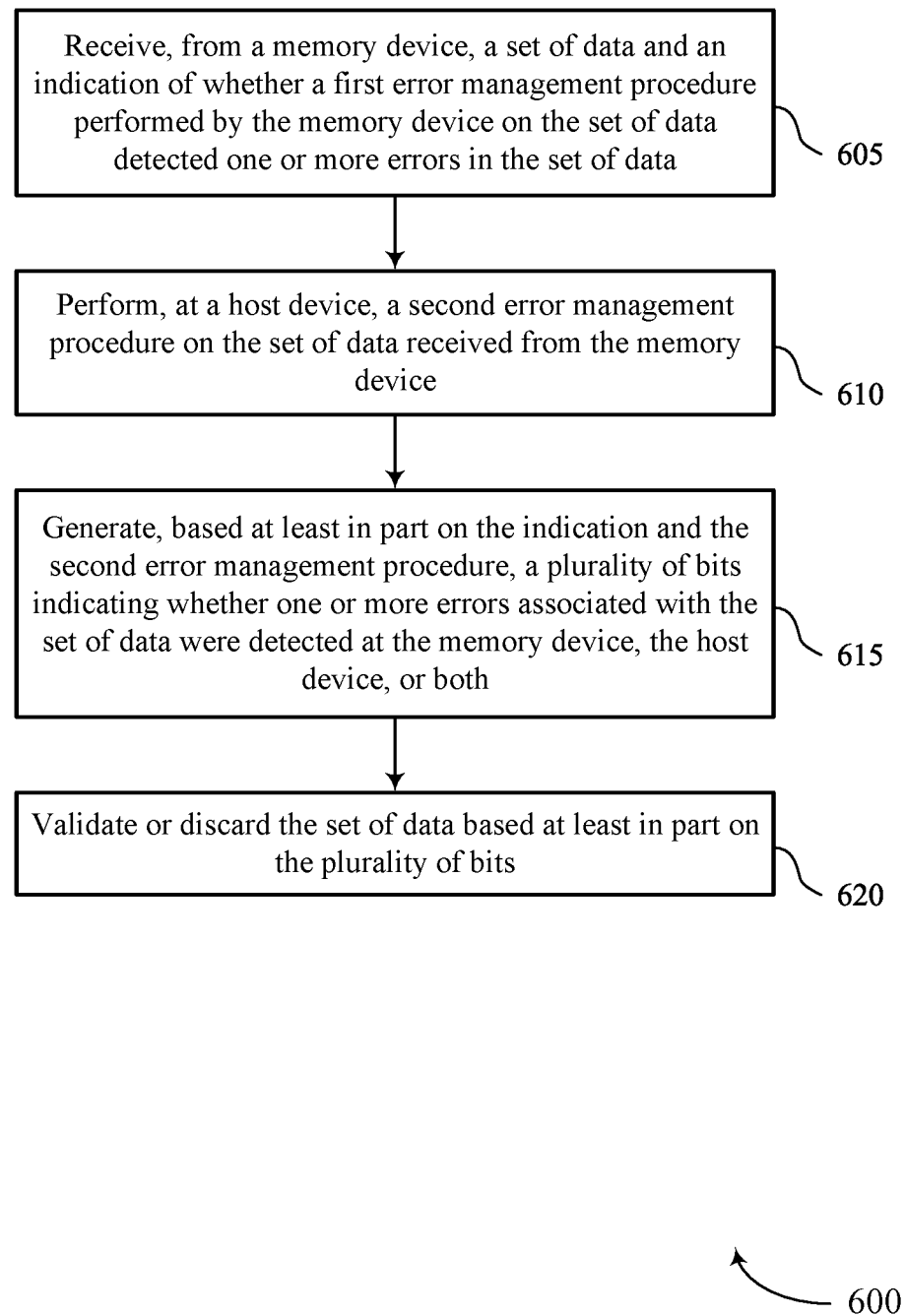
FIG. 6 shows a flowchart illustrating a method or methods that support coordinated error protection in accordance with examples as disclosed herein.

FIG. 6 shows a flowchart illustrating a method 600 that supports coordinated error protection in accordance with examples as disclosed herein. The operations of method 600 may be implemented by a host device or its components as described herein. For example, the operations of method 600 may be performed by a host device as described with reference to FIGS. 1 through 5. In some examples, a host device may execute a set of instructions to control the functional elements of the device to perform the described functions. Additionally or alternatively, the host device may perform aspects of the described functions using special-purpose hardware.

At 605, the method may include receiving, from a memory device, a set of data and an indication of whether a first error management procedure performed by the memory device on the set of data detected one or more errors in the set of data. The operations of 605 may be performed in accordance with examples as disclosed herein. In some examples, aspects of the operations of 605 may be performed by a data processing component 525 as described with reference to FIG. 5.

At 610, the method may include performing, at a host device, a second error management procedure on the set of data received from the memory device. The operations of 610 may be performed in accordance with examples as disclosed herein. In some examples, aspects of the operations of 610 may be performed by an error management component 530 as described with reference to FIG. 5.

At 615, the method may include generating, based at least in part on the indication and the second error management procedure, a plurality of bits indicating whether one or more errors associated with the set of data were detected at the memory device, the host device, or both. The operations of 615 may be performed in accordance with examples as disclosed herein. In some examples, aspects of the operations of 615 may be performed by a syndrome logic component 535 as described with reference to FIG. 5.

At 620, the method may include validating or discarding the set of data based at least in part on the plurality of bits. The operations of 620 may be performed in accordance with examples as disclosed herein. In some examples, aspects of the operations of 620 may be performed by a data manager 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a memory device, a set of data and an indication of whether a first error management procedure performed by the memory device on the set of data detected one or more errors in the set of data; performing, at a host device, a second error management procedure on the set of data received from the memory device; generating, based at least in part on the indication and the second error management procedure, a plurality of bits indicating whether one or more errors associated with the set of data were detected at the memory device, the host device, or both; and validating or discarding the set of data based at least in part on the plurality of bits.

Aspect 2: The method, apparatus, or non-transitory computer-readable medium of aspect 1, further including operations, features, circuitry, logic, means, or instructions, or any combination thereof for determining that the first error management procedure identified the set of data as error-free based at least in part on the indication; determining that the second error management procedure identified the set of data as error-free based at least in part on a result of the second error management procedure, where generating the plurality of bits is based at least in part on determining that the first error management procedure and the second error management procedure identified the set of data as error-free; and validating, based at least in part on generating the plurality of bits, the set of data for use based at least in part on the plurality of bits indicating that the set of data is error-free.

Aspect 3: The method, apparatus, or non-transitory computer-readable medium of any of aspects 1 through 2, further including operations, features, circuitry, logic, means, or instructions, or any combination thereof for determining that the first error management procedure detected an error in the set of data based at least in part on the indication and determining that the second error management procedure identified the set of data as error-free based at least in part on a result of the second error management procedure, where generating the plurality of bits is based at least in part on determining that the first error management procedure detected the error in the set of data and the second error management procedure identified the set of data as error-free.

Aspect 4: The method, apparatus, or non-transitory computer-readable medium of aspect 3, further including operations, features, circuitry, logic, means, or instructions, or any combination thereof for validating, when a first operating mode associated with a first threshold for data reliability is activated, the set of data for used based at least in part on the plurality of bits indicating that the first error management procedure detected the error in the set of data and the second error management procedure identified the set of data as error-free and discarding, when a second operating mode associated with a second threshold for data reliability is activated, the set of data based at least in part on the plurality of bits indicating that the first error management procedure detected the error in the set of data and the second error management procedure identified the set of data as error-free, where the first threshold is less than the second threshold.

Aspect 5: The method, apparatus, or non-transitory computer-readable medium of any of aspects 1 through 4, further including operations, features, circuitry, logic, means, or instructions, or any combination thereof for determining that the first error management procedure identified the set of data as error-free based at least in part on the indication; determining that the second error management procedure detected an error in the set of data based at least in part on a result of the second error management procedure, where generating the plurality of bits is based at least in part on determining that the first error management procedure identified the set of data as error-free and the second error management procedure detected the error in the set of data; and discarding, when a mode associated with detecting errors is activated, the set of data based at least in part on the plurality of bits indicating that the second error management procedure detected the error in the set of data.

Aspect 6: The method, apparatus, or non-transitory computer-readable medium of any of aspects 1 through 5, further including operations, features, circuitry, logic, means, or instructions, or any combination thereof for determining that the first error management procedure identified the set of data as error-free based at least in part on the indication; determining that the second error management procedure detected an error in the set of data based at least in part on a result of the second error management procedure, where generating the plurality of bits is based at least in part on determining that the first error management procedure identified the set of data as error-free and the second error management procedure detected the error in the set of data; and attempting, by the second error management procedure when a mode associated with correcting errors is activated, to correct the error in the set of data based at least in part on the plurality of bits indicating that the first error management procedure identified the set of data as error-free and the second error management procedure detected the error in the set of data.

Aspect 7: The method, apparatus, or non-transitory computer-readable medium of aspect 6, further including operations, features, circuitry, logic, means, or instructions, or any combination thereof for validating, when a first operating mode associated with a first threshold for data reliability being activated, the set of data based at least in part on the second error management procedure attempting to correct the error in the set of data and discarding, when a second operating mode associated with a second threshold for data reliability being activated, the set of data based at least in part on the plurality of bits indicating that the first error management procedure identified the set of data as error-free and the second error management procedure detected the error in the set of data.

Aspect 8: The method, apparatus, or non-transitory computer-readable medium of any of aspects 1 through 7, further including operations, features, circuitry, logic, means, or instructions, or any combination thereof for determining that the first error management procedure detected a first error in the set of data based at least in part on receiving the indication; determining that the second error management procedure detected a second error in the set of data based at least in part on a result of the second error management procedure, where generating the plurality of bits is based at least in part on determining that the first error management procedure and the second error management procedure detected errors in the set of data; and discarding the set of data based at least in part on the plurality of bits indicating the first error management procedure and the second error management procedure detected errors in the set of data.

Aspect 9: The method, apparatus, or non-transitory computer-readable medium of any of aspects 1 through 8 where performing the second error management procedure includes operations, features, circuitry, logic, means, or instructions, or any combination thereof for generating a first set of bits associated with error management based at least in part on the set of data received from the memory device; comparing the first set of bits associated with error management and a second set of bits associated with error management that is received from the memory device; and outputting a result of the comparing, where a result of the second error management procedure is based at least in part on the result of the comparing.

Aspect 10: The method, apparatus, or non-transitory computer-readable medium of aspect 9 where outputting the result of the comparing includes operations, features, circuitry, logic, means, or instructions, or any combination thereof for outputting a first logic value if the first set of bits associated with error management is different than the second set of bits associated with error management or a second logic value if the first set of bits associated with error management is the same as the second set of bits associated with error management, where the first logic value is associated with detecting an error in the set of data and the second logic value is associated with identifying the set of data as error-free.

Aspect 11: The method, apparatus, or non-transitory computer-readable medium of any of aspects 9 through 10 where performing the second error management procedure includes operations, features, circuitry, logic, means, or instructions, or any combination thereof for generating a bit based at least in part on the set of data and the second set of bits associated with error management received from the memory device; comparing the bit with the result of the comparing; and outputting a result of the second comparing, where the result of the second error management procedure is based at least in part on the result of the second comparing.

Aspect 12: The method, apparatus, or non-transitory computer-readable medium of aspect 11 where outputting the result of the comparing includes operations, features, circuitry, logic, means, or instructions, or any combination thereof for outputting a first logic value if the bit and the result of the comparing represents the first logic value or a second logic value if the bit or the result of the comparing represent the second logic value, where the first logic value is associated with detecting an error in the set of data and the second logic value is associated with identifying the set of data as error-free.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 13: An apparatus, including: a receiver configured to receive, from a memory device, a set of data and an indication of whether a first error management procedure performed by the memory device on the set of data detected one or more errors in the set of data; an error management component configured to perform a second error management procedure on the set of data received from the memory device; logic configured to receive the indication and a result of the second error management procedure and to output, based at least in part on the indication and the result of the second error management procedure, a plurality of bits indicating whether one or more errors associated with the set of data were detected at the memory device, a host device including the error management component, or both; and a controller configured to validate or discard the set of data based at least in part on the plurality of bits and to perform an operation.

Aspect 14: The apparatus of aspect 13, where: a first value of the plurality of bits indicates that the first error management procedure and the second error management procedure identified the set of data as error-free, a second value of the plurality of bits indicates that the first error management procedure detected a first error in the set of data and the second error management procedure identified the set of data as error-free, a third value of the plurality of bits indicates that the first error management procedure identified the set of data as error-free and the second error management procedure detected a second error in the set of data, and a fourth value of the plurality of bits indicates that the first error management procedure and the second error management procedure detected errors in the set of data.

Aspect 15: The apparatus of any of aspects 13 through 14, where the logic includes: first logic including a first AND gate, where a first input of the first AND gate is configured to receive an inverted version of the indication and a second input of the first AND gate is configured to receive an inverted version of the result of the second error management procedure, second logic including a second AND gate, where a first input of the second AND gate is configured to receive the indication and a second input of the second AND gate is configured to the inverted version of the result of the second error management procedure, third logic including a third AND gate, where a first input of the third AND gate is configured to receive the inverted version of the indication and a second input of the third AND gate is configured to receive the result of the second error management procedure, and fourth logic including a fourth AND gate, where a first input of the fourth AND gate is configured to receive the indication and a second input of the fourth AND gate is configured to receive the result of the second error management procedure.

Aspect 16: The apparatus of aspect 15, where: the first logic includes a first inverter coupled with the first input of the first AND gate and a second inverter coupled with a second input of the first AND gate, where the first inverter is configured to receive the indication and the second inverter is configured to receive the result of the second error management procedure, the second logic includes a third inverter coupled with the second input of the second AND gate and configured to receive the result of the second error management procedure, and the third logic includes a fourth inverter coupled with the first input of the third AND gate and configured to receive the indication.

Aspect 17: The apparatus of any of aspects 15 through 16, where: to indicate that the first error management procedure and the second error management procedure identified the set of data as error-free, the first logic is configured to output a first voltage and the second logic, the third logic, and the fourth logic are configured to output a second voltage, to indicate that the first error management procedure detected a first error in the set of data and the second error management procedure identified the set of data as error-free, the second logic is configured to output the first voltage and the first logic, the third logic, and the fourth logic are configured to output the second voltage, to indicate that the first error management procedure identified the set of data as error-free and the second error management procedure detected a second error in the set of data, the third logic is configured to output the first voltage and the first logic, the second logic, and the fourth logic are configured to output the second voltage, or to indicate that the first error management procedure and the second error management procedure detected errors in the set of data, the fourth logic is configured to output the first voltage and the first logic, the second logic, and the third logic are configured to output the second voltage, where an output of the first logic corresponds to a first bit of the plurality of bits, an output of the second logic corresponds to a second bit of the plurality of bits, an output of the third logic corresponds to a third bit of the plurality of bits, and an output of the fourth logic corresponds to a fourth bit of the plurality of bits.

Aspect 18: The apparatus of any of aspects 13 through 17, where the controller is further configured to: configure the host device to operate in a first mode associated with a first threshold for data reliability or a second mode associated with a second threshold for data reliability.

Aspect 19: The apparatus of aspect 18, where the controller is further configured to: discard, based at least in part on the first mode being configured, the set of data when the plurality of bits includes a first value indicating that the first error management procedure detected a first error in the set of data and the second error management procedure identified the set of data as error free; and discard, based at least in part on the first mode and a third mode associated with correcting errors in the set of data being configured, the set of data when the plurality of bits includes a second value indicating that the first error management procedure identified the set of data as error-free and the second error management procedure detected a second error in the set of data.

Aspect 20: The apparatus of any of aspects 13 through 19, where the error management component includes: a first plurality of logic gates configured to compare a first set of bits associated with error management and received from the memory device with a second set of bits associated with error management and generated by the error management component for the set of data.

Aspect 21: The apparatus of aspect 20, where the error management component is further configured to generate a bit associated with error management based at least in part on the set of data and the first set of bits associated with error management, the error management component further including: a logic gate coupled with an output of the first plurality of logic gates and configured to compare the output of the first plurality of logic gates with the bit associated with error management.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving, from a memory device, a set of data and an indication of whether a first error management procedure performed by the memory device on the set of data detected one or more errors in the set of data;
    performing, at a host device, a second error management procedure on the set of data received from the memory device;
    generating, based at least in part on the indication and the second error management procedure, a plurality of bits indicating whether one or more errors associated with the set of data were detected at the memory device, the host device, or both; and
    validating or discarding the set of data based at least in part on the plurality of bits.

2. The method of claim 1, further comprising:
    determining that the first error management procedure identified the set of data as error-free based at least in part on the indication;
    determining that the second error management procedure identified the set of data as error-free based at least in part on a result of the second error management procedure, wherein generating the plurality of bits is based at least in part on determining that the first error management procedure and the second error management procedure identified the set of data as error-free; and
    validating, based at least in part on generating the plurality of bits, the set of data for use based at least in part on the plurality of bits indicating that the set of data is error-free.

3. The method of claim 1, further comprising:
  determining that the first error management procedure detected an error in the set of data based at least in part on the indication; and
  determining that the second error management procedure identified the set of data as error-free based at least in part on a result of the second error management procedure, wherein generating the plurality of bits is based at least in part on determining that the first error management procedure detected the error in the set of data and the second error management procedure identified the set of data as error-free.

4. The method of claim 3, further comprising:
  validating, when a first operating mode associated with a first threshold for data reliability is activated, the set of data for used based at least in part on the plurality of bits indicating that the first error management procedure detected the error in the set of data and the second error management procedure identified the set of data as error-free; or
  discarding, when a second operating mode associated with a second threshold for data reliability is activated, the set of data based at least in part on the plurality of bits indicating that the first error management procedure detected the error in the set of data and the second error management procedure identified the set of data as error-free, wherein the first threshold is less than the second threshold.

5. The method of claim 1, further comprising:
  determining that the first error management procedure identified the set of data as error-free based at least in part on the indication;
  determining that the second error management procedure detected an error in the set of data based at least in part on a result of the second error management procedure, wherein generating the plurality of bits is based at least in part on determining that the first error management procedure identified the set of data as error-free and the second error management procedure detected the error in the set of data; and
  discarding, when a mode associated with detecting errors is activated, the set of data based at least in part on the plurality of bits indicating that the second error management procedure detected the error in the set of data.

6. The method of claim 1, further comprising:
  determining that the first error management procedure identified the set of data as error-free based at least in part on the indication;
  determining that the second error management procedure detected an error in the set of data based at least in part on a result of the second error management procedure, wherein generating the plurality of bits is based at least in part on determining that the first error management procedure identified the set of data as error-free and the second error management procedure detected the error in the set of data; and
  attempting, by the second error management procedure when a mode associated with correcting errors is activated, to correct the error in the set of data based at least in part on the plurality of bits indicating that the first error management procedure identified the set of data as error-free and the second error management procedure detected the error in the set of data.

7. The method of claim 6, further comprising:
  validating, when a first operating mode associated with a first threshold for data reliability being activated, the set of data based at least in part on the second error management procedure attempting to correct the error in the set of data; or
  discarding, when a second operating mode associated with a second threshold for data reliability being activated, the set of data based at least in part on the plurality of bits indicating that the first error management procedure identified the set of data as error-free and the second error management procedure detected the error in the set of data.

8. The method of claim 1, further comprising:
  determining that the first error management procedure detected a first error in the set of data based at least in part on receiving the indication;
  determining that the second error management procedure detected a second error in the set of data based at least in part on a result of the second error management procedure, wherein generating the plurality of bits is based at least in part on determining that the first error management procedure and the second error management procedure detected errors in the set of data; and
  discarding the set of data based at least in part on the plurality of bits indicating the first error management procedure and the second error management procedure detected errors in the set of data.

9. The method of claim 1, wherein performing the second error management procedure comprises:
  generating a first set of bits associated with error management based at least in part on the set of data received from the memory device;
  comparing the first set of bits associated with error management and a second set of bits associated with error management that is received from the memory device; and
  outputting a result of comparing the first set of bits and the second set of bits, wherein a result of the second error management procedure is based at least in part on the result of comparing the first set of bits and the second set of bits.

10. The method of claim 9, wherein outputting the result of comparing the first set of bits and the second set of bits comprises:
  outputting a first logic value if the first set of bits associated with error management is different than the second set of bits associated with error management or a second logic value if the first set of bits associated with error management is the same as the second set of bits associated with error management, wherein the first logic value is associated with detecting an error in the set of data and the second logic value is associated with identifying the set of data as error-free.

11. The method of claim 9, wherein performing the second error management procedure comprises:
  generating a bit based at least in part on the set of data and the second set of bits associated with error management received from the memory device;
  comparing the bit with the result of comparing the first set of bits and the second set of bits; and
  outputting a result of comparing the bit with the result of comparing the first set of bits and the second set of bits, wherein the result of the second error management procedure is based at least in part on the result of comparing the bit with the result of comparing the first set of bits and the second set of bits.

12. The method of claim 11, wherein outputting the result of comparing the bit with the result of comparing the first set of bits and the second set of bits comprises:

outputting a first logic value if the bit and the result of comparing the first set of bits and the second set of bits represents the first logic value or a second logic value if the bit or the result of comparing the first set of bits and the second set of bits represent the second logic value, wherein the first logic value is associated with detecting an error in the set of data and the second logic value is associated with identifying the set of data as error-free.

13. An apparatus, comprising:
a receiver configured to receive, from a memory device, a set of data and an indication of whether a first error management procedure performed by the memory device on the set of data detected one or more errors in the set of data;
an error management component configured to perform a second error management procedure on the set of data received from the memory device;
logic configured to receive the indication and a result of the second error management procedure and to output, based at least in part on the indication and the result of the second error management procedure, a plurality of bits indicating whether one or more errors associated with the set of data were detected at the memory device, a host device comprising the error management component, or both; and
a controller configured to validate or discard the set of data based at least in part on the plurality of bits and to perform an operation.

14. The apparatus of claim 13, wherein:
a first value of the plurality of bits indicates that the first error management procedure and the second error management procedure identified the set of data as error-free,
a second value of the plurality of bits indicates that the first error management procedure detected a first error in the set of data and the second error management procedure identified the set of data as error-free,
a third value of the plurality of bits indicates that the first error management procedure identified the set of data as error-free and the second error management procedure detected a second error in the set of data, and
a fourth value of the plurality of bits indicates that the first error management procedure and the second error management procedure detected errors in the set of data.

15. The apparatus of claim 13, wherein the logic comprises:
first logic comprising a first AND gate, wherein a first input of the first AND gate is configured to receive an inverted version of the indication and a second input of the first AND gate is configured to receive an inverted version of the result of the second error management procedure,
second logic comprising a second AND gate, wherein a first input of the second AND gate is configured to receive the indication and a second input of the second AND gate is configured to the inverted version of the result of the second error management procedure,
third logic comprising a third AND gate, wherein a first input of the third AND gate is configured to receive the inverted version of the indication and a second input of the third AND gate is configured to receive the result of the second error management procedure, and
fourth logic comprising a fourth AND gate, wherein a first input of the fourth AND gate is configured to receive the indication and a second input of the fourth AND gate is configured to receive the result of the second error management procedure.

16. The apparatus of claim 15, wherein:
the first logic comprises a first inverter coupled with the first input of the first AND gate and a second inverter coupled with the second input of the first AND gate, wherein the first inverter is configured to receive the indication and the second inverter is configured to receive the result of the second error management procedure,
the second logic comprises a third inverter coupled with the second input of the second AND gate and configured to receive the result of the second error management procedure, and
the third logic comprises a fourth inverter coupled with the first input of the third AND gate and configured to receive the indication.

17. The apparatus of claim 15, wherein:
to indicate that the first error management procedure and the second error management procedure identified the set of data as error-free, the first logic is configured to output a first voltage and the second logic, the third logic, and the fourth logic are configured to output a second voltage,
to indicate that the first error management procedure detected a first error in the set of data and the second error management procedure identified the set of data as error-free, the second logic is configured to output the first voltage and the first logic, the third logic, and the fourth logic are configured to output the second voltage,
to indicate that the first error management procedure identified the set of data as error-free and the second error management procedure detected a second error in the set of data, the third logic is configured to output the first voltage and the first logic, the second logic, and the fourth logic are configured to output the second voltage, or
to indicate that the first error management procedure and the second error management procedure detected errors in the set of data, the fourth logic is configured to output the first voltage and the first logic, the second logic, and the third logic are configured to output the second voltage,
wherein an output of the first logic corresponds to a first bit of the plurality of bits, an output of the second logic corresponds to a second bit of the plurality of bits, an output of the third logic corresponds to a third bit of the plurality of bits, and an output of the fourth logic corresponds to a fourth bit of the plurality of bits.

18. The apparatus of claim 13, wherein the controller is further configured to:
configure the host device to operate in a first mode associated with a first threshold for data reliability or a second mode associated with a second threshold for data reliability.

19. The apparatus of claim 18, wherein the controller is further configured to:
discard, based at least in part on the first mode being configured, the set of data when the plurality of bits comprises a first value indicating that the first error management procedure detected a first error in the set of data and the second error management procedure identified the set of data as error free; and
discard, based at least in part on the first mode and a third mode associated with correcting errors in the set of data being configured, the set of data when the plurality of bits comprises a second value indicating that the first error management procedure identified the set of data as error-free and the second error management procedure detected a second error in the set of data.

20. The apparatus of claim 13, wherein the error management component comprises:
a first plurality of logic gates configured to compare a first set of bits associated with error management and received from the memory device with a second set of bits associated with error management and generated by the error management component for the set of data.

21. The apparatus of claim 20, wherein the error management component is further configured to generate a bit associated with error management based at least in part on the set of data and the first set of bits associated with error management, the error management component further comprising:
a logic gate coupled with an output of the first plurality of logic gates and configured to compare the output of the first plurality of logic gates with the bit associated with error management.

22. An apparatus, comprising:
a controller configured to cause the apparatus to:
receive, from a memory device, a set of data and an indication of whether a first error management procedure performed by the memory device on the set of data detected one or more errors in the set of data;
perform, at a host device, a second error management procedure on the set of data received from the memory device;
generate, based at least in part on the indication and the second error management procedure, a plurality of bits indicating whether one or more errors associated with the set of data were detected at the memory device, the host device, or both; and
validate or discard the set of data based at least in part on the plurality of bits.

23. The apparatus of claim 22, wherein the controller is further configured to cause the apparatus to:
determine that the first error management procedure identified the set of data as error-free based at least in part on the indication;
determine that the second error management procedure identified the set of data as error-free based at least in part on a result of the second error management procedure, wherein generating the plurality of bits is based at least in part on determining that the first error management procedure and the second error management procedure identified the set of data as error-free; and
validate, based at least in part on generating the plurality of bits, the set of data for use based at least in part on the plurality of bits indicating that the set of data is error-free.

24. The apparatus of claim 22, wherein the controller is further configured to cause the apparatus to:
determine that the first error management procedure detected an error in the set of data based at least in part on the indication; and
determine that the second error management procedure identified the set of data as error-free based at least in part on a result of the second error management procedure, wherein generating the plurality of bits is based at least in part on determining that the first error management procedure detected the error in the set of data and the second error management procedure identified the set of data as error-free.

25. The apparatus of claim 22, wherein the controller is further configured to cause the apparatus to:
determine that the first error management procedure identified the set of data as error-free based at least in part on the indication;
determine that the second error management procedure detected an error in the set of data based at least in part on a result of the second error management procedure, wherein generating the plurality of bits is based at least in part on determining that the first error management procedure identified the set of data as error-free and the second error management procedure detected the error in the set of data; and
discard, when a mode associated with detecting errors is activated, the set of data based at least in part on the plurality of bits indicating that the second error management procedure detected the error in the set of data.

26. The apparatus of claim 22, wherein the controller is further configured to cause the apparatus to:
determine that the first error management procedure identified the set of data as error-free based at least in part on the indication;
determine that the second error management procedure detected an error in the set of data based at least in part on a result of the second error management procedure, wherein generating the plurality of bits is based at least in part on determining that the first error management procedure identified the set of data as error-free and the second error management procedure detected the error in the set of data; and
attempt, by the second error management procedure when a mode associated with correcting errors is activated, to correct the error in the set of data based at least in part on the plurality of bits indicating that the first error management procedure identified the set of data as error-free and the second error management procedure detected the error in the set of data.

27. An apparatus, comprising:
a receiver configured to receive, from a memory device, a set of data and an indication of whether a first error management procedure performed by the memory device on the set of data detected one or more errors in the set of data;
an error management component configured to perform a second error management procedure on the set of data received from the memory device;
logic configured to generate, based at least in part on the indication and the second error management procedure, a plurality of bits indicating whether one or more errors associated with the set of data were detected at the memory device, a host device comprising the error management component, or both; and
a controller configured to validate or discard the set of data based at least in part on the plurality of bits.

28. The apparatus of claim 27, wherein:
the logic is further configured to:
determine that the first error management procedure identified the set of data as error-free based at least in part on the indication;
determine that the second error management procedure identified the set of data as error-free based at least in part on result of the second error management procedure, wherein generating the plurality of bits is based at least in part on determining that the first error management procedure and the second error management procedure identified the set of data as error-free; and the controller is further configured to validate, based at least in part on generating the plurality of bits, the set of data for use based at least in part on the plurality of bits indicating that the set of data is error-free.

29. A non-transitory, computer-readable medium storing code comprising instructions, wherein the instructions are executable by a processor to:
- receive, from a memory device, a set of data and an indication of whether a first error management procedure performed by the memory device on the set of data detected one or more errors in the set of data;
- perform, at a host device, a second error management procedure on the set of data received from the memory device;
- generate, based at least in part on the indication and the second error management procedure, a plurality of bits indicating whether one or more errors associated with the set of data were detected at the memory device, the host device, or both; and
- validate or discard the set of data based at least in part on the plurality of bits.

30. The non-transitory, computer-readable medium of claim 29, wherein the instructions are further executable by the processor to:
- determine that the first error management procedure identified the set of data as error-free based at least in part on the indication;
- determine that the second error management procedure identified the set of data as error-free based at least in part on a result of the second error management procedure, wherein generating the plurality of bits is based at least in part on determining that the first error management procedure and the second error management procedure identified the set of data as error-free; and
- validate, based at least in part on generating the plurality of bits, the set of data for use based at least in part on the plurality of bits indicating that the set of data is error-free.

* * * * *